United States Patent
Figge et al.

(10) Patent No.: US 8,240,966 B2
(45) Date of Patent: Aug. 14, 2012

(54) FASTENING APPARATUS WITH TOLERANCE EQUALIZATION

(75) Inventors: Hans Ulrich Figge, Schloss Holte-Stukenbrock (DE); Ingo Burger, Schloss Holte-Stukenbrock (DE)

(73) Assignee: Bollhoff Verbindungstechnik GmbH (DE)

( * ) Notice: Subject to any disclaimer, the term of this patent is extended or adjusted under 35 U.S.C. 154(b) by 1010 days.

(21) Appl. No.: 12/132,199

(22) Filed: Jun. 3, 2008

(65) Prior Publication Data

US 2008/0304907 A1 Dec. 11, 2008

(30) Foreign Application Priority Data

Jun. 11, 2007 (DE) .................. 20 2007 008 152 U

(51) Int. Cl.
*F16B 37/04* (2006.01)
*F16B 21/04* (2006.01)
(52) U.S. Cl. ....................... 411/546; 411/553
(58) Field of Classification Search .............. 411/546, 411/535, 349, 549, 553
See application file for complete search history.

(56) References Cited

U.S. PATENT DOCUMENTS

| | | | | |
|---|---|---|---|---|
| 2,233,242 A | * | 2/1941 | Burke | 411/181 |
| 2,748,825 A | * | 6/1956 | Launay | 411/112 |
| 3,123,389 A | * | 3/1964 | Biesecker, D. L. | 292/218 |
| 3,986,780 A | * | 10/1976 | Nivet | 403/353 |
| 4,377,359 A | * | 3/1983 | Peterson | 411/112 |
| 5,288,191 A | * | 2/1994 | Ruckert et al. | 411/432 |
| 6,357,953 B1 | * | 3/2002 | Ballantyne | 403/43 |
| 6,688,830 B2 | * | 2/2004 | Kluting | 411/546 |
| 6,776,566 B2 | * | 8/2004 | Kobusch et al. | 411/546 |
| 7,857,567 B2 | * | 12/2010 | Iwata et al. | 411/546 |
| 2002/0150445 A1 | * | 10/2002 | Ozawa et al. | 411/546 |
| 2005/0025566 A1 | | 2/2005 | Hasegawa | |
| 2005/0047893 A1 | * | 3/2005 | Schwarzbich | 411/546 |
| 2006/0226312 A1 | * | 10/2006 | Masuch | 248/188 |
| 2007/0092355 A1 | * | 4/2007 | Burger et al. | 411/535 |

FOREIGN PATENT DOCUMENTS

| | | |
|---|---|---|
| DE | 20119112 U1 | 4/2002 |
| EP | 1 744 063 A2 | 1/2007 |
| EP | 1780424 A1 | 5/2007 |
| FR | 2 135 463 | 5/1971 |
| WO | WO 05/047712 A1 | 5/2005 |

* cited by examiner

*Primary Examiner* — Flemming Saether
(74) *Attorney, Agent, or Firm* — Seyfarth Shaw LLP

(57) ABSTRACT

A fastening apparatus for fastening a first component to a second component with automatic equalization of tolerances in the separation distance between the first and second component s, including a receiving element and an adjustment element, which can be screwed to the receiving element by way of a fastening screw. The adjustment element can be turned via a detachable drag connection when the fastening screw is turned. The receiving element below a flange has at least one radially projecting holding projection so that the receiving element can be immobilized on the first component.

10 Claims, 6 Drawing Sheets

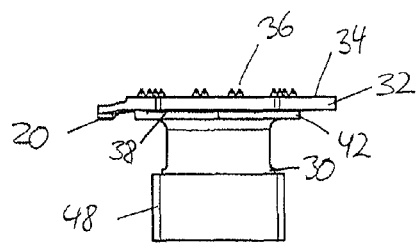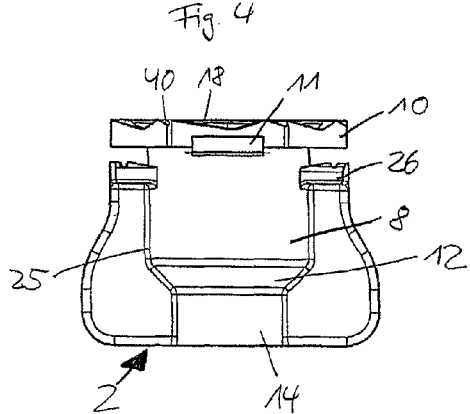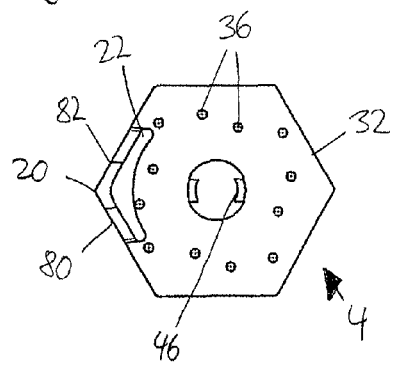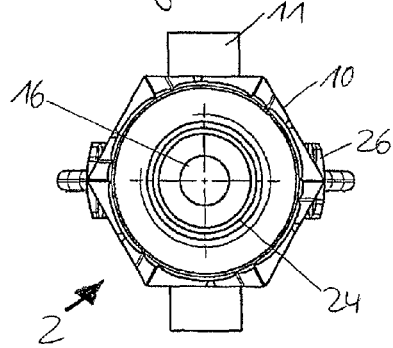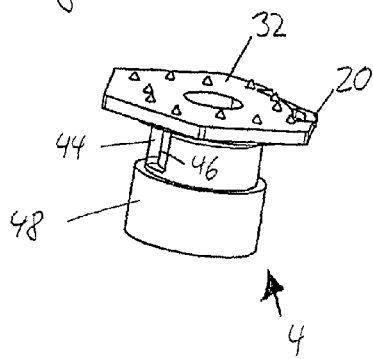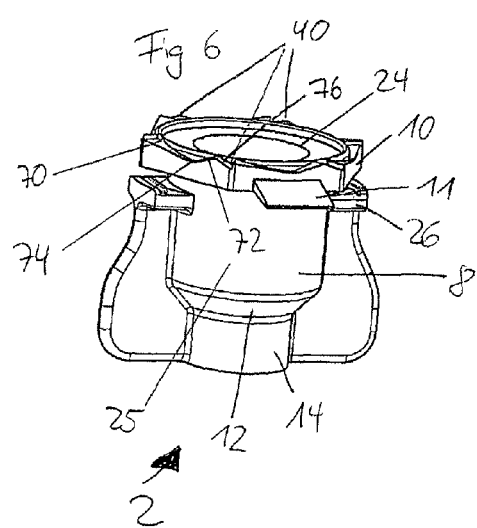

1

FASTENING APPARATUS WITH TOLERANCE EQUALIZATION

BACKGROUND IN THE INVENTION

The present invention relates to a fastening apparatus for fastening a component B to a component A with automatic equalization of tolerances in the separation distance between the two components.

Many varieties of such fastening apparatuses with tolerance equalization are known. They normally consist of an adjustment bushing with a so-called drag section, which can establish a friction connection with a fastening screw. When turning the fastening screw, the adjustment bushing is thus also turned until it lays against one of the two components, whereupon the friction connection is overridden when the fastening screw is turned further and the torque increases accordingly, so that both components can then be tensioned with each other by the fastening screw via the adjustment bushing.

This type of tolerance equalization arrangement is known from European patent application EP 1 780 424. This arrangement comprises a receiving element designed as a single piece and an adjustment element designed as a single piece. The receiving element has a fastening section with a self-furrowing and/or self-forming thread, which can be screwed into the one component for producing a screw connection, wherein the screw connection is a plastic-in-plastic screw connection.

SUMMARY OF THE INVENTION

The object of the present invention is to improve the design of a fastening apparatus with automatic tolerance equalization of the specified type such that the assembly and disassembly of the fastening apparatus are simplified.

The fastening apparatus in accordance with the present invention is defined in claim 1. It serves to fasten a component B to a component A with automatic equalization of tolerances in the separation distance between the component B and the component A. The fastening apparatus according to the invention consists of a receiving element and an adjustment element, which can be screwed together with the receiving element via a first thread pairing of a first thread direction, and a fastening screw, which can be screwed into the receiving element via a second thread pairing of an opposite second thread direction and can be connected with the adjustment element via a detachable drag connection, in order to turn the adjustment element when the fastening screw is turned and to thereby move the adjustment element to abut for the purpose of tolerance equalization against component B, while the receiving element has at least one radially projecting holding projection below a flange so that the receiving element can be immobilized between the flange and the at least one holding projection on component A through the form—(positive) and/or force-fit (frictional) holding of component A. A plurality of holding projections is preferably arranged circumferentially on the receiving element. Thus, the outer form of the receiving element with holding projections has a certain silhouette, which can be inserted into a complementarily shaped keyhole in component A. After turning the receiving element along its longitudinal axis, the component A is held between the flange and the holding projections of the receiving element. This holding is based on a positive and/or frictional connection. The construction and functionality of the receiving element is enhanced by at least one spring-element, which is arranged adjacent to the flange of the receiving element. This spring element supports on one hand the fastening of the component A between the flange and the holding projection and preferably serves on the other hand to lock the receiving element in the keyhole of component A.

Further advantageous embodiments of the invention arise from the dependent claims.

BRIEF DESCRIPTION OF THE FIGURES

An exemplary embodiment of the invention is explained in greater detail based on the drawings.

FIG. 1 shows a lateral view of an adjustment element;

FIG. 2 shows a view from the top of the adjustment element in FIG. 1;

FIG. 3 shows a perspective view of the adjustment element in FIGS. 1 and 2;

FIG. 4 shows a lateral view of a receiving element;

FIG. 5 shows a view from the top of the receiving element in FIG. 4;

FIG. 6 shows a perspective view of the receiving element in FIGS. 4 and 5;

DETAILED DESCRIPTION OF THE EXEMPLARY EMBODIMENTS OF THE INVENTION

Figure 10:
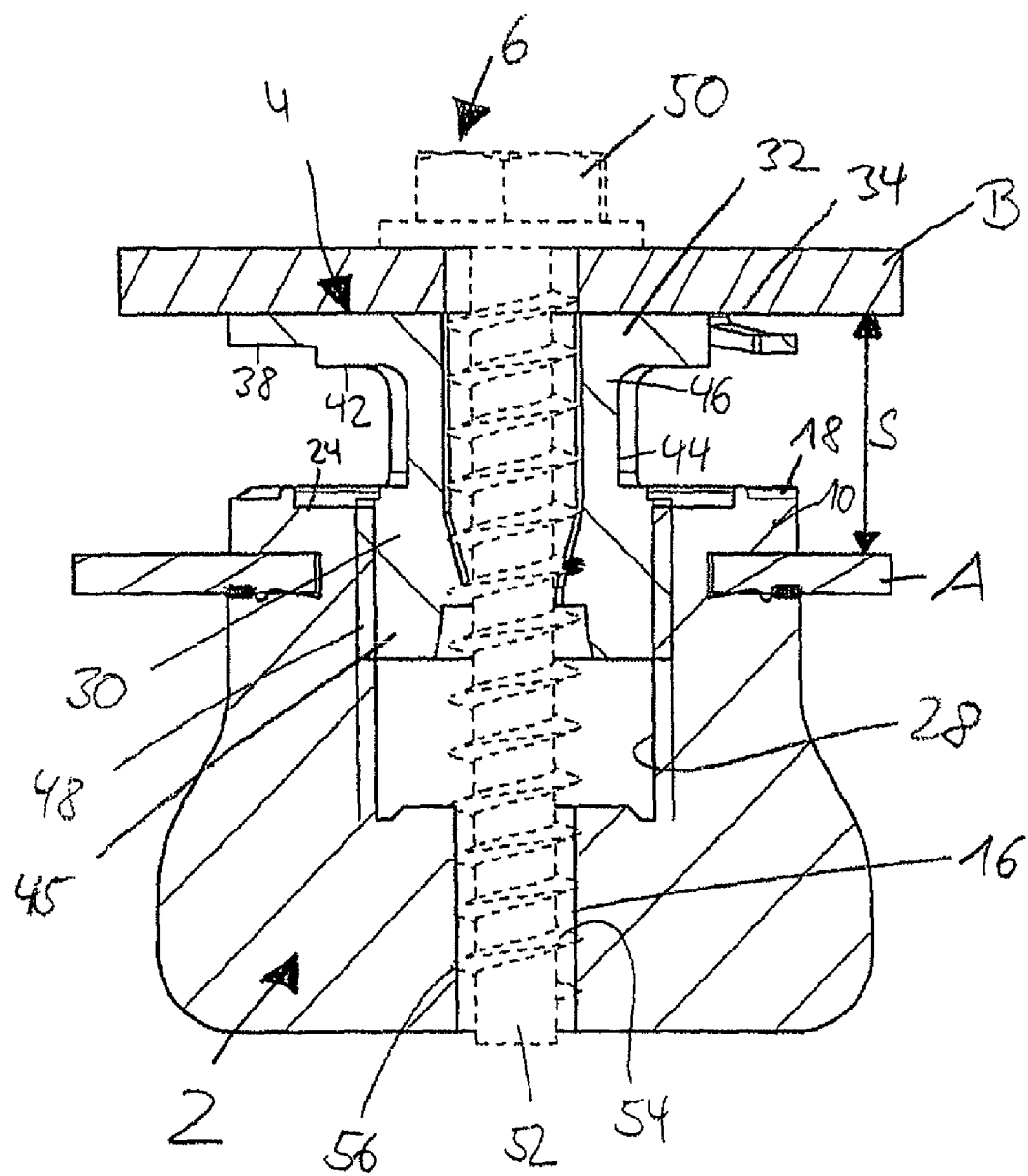
FIG. 10 shows a sectional view of an assembled fastening apparatus designed according to the invention.

The fastening apparatus shown in FIG. 10 serves to fasten a component B to a component A. The component A is for example an automobile bracket, while component B is a part of a headlight housing immobilized by gauges. The component A and the component B have a separation distance S, which can vary based on installation- and/or production-caused tolerances. The fastening apparatus shown enables an automatic equalization of these tolerances. Since the headlight housing can also be guided to other locations (not shown), a frictional connection is not required between components A and B at this location; i.e. when installed, a lateral displacement of components A and B is still possible if necessary upon overcoming corresponding friction.

The fastening apparatus is made up of a receiving element 2, an adjustment element 4 and a fastening screw 6. The receiving element 2 and the adjustment element 4 form a pre-installable structural unit E (see FIG. 9), as will be described in greater detail.

Now, in addition to FIG. 10, reference is made to FIGS. 4 through 6, in which the receiving element 2 is shown in detail. The receiving element 2 designed as a single piece consists of a sleeve-shaped body 8, which switches over to a flange 10 on its one axial end and to a conical insertion section 12 on its other axial end. An axially inward running, sleeve-shaped socket 14, which is provided with a smooth-walled bore hole 16, is formed on the insertion section 12.

The flange 10 has a front surface 18 lying in a radial plane, in which a single axially running latch protrusion is provided according to an exemplary embodiment (not shown). The latch protrusion is arranged within a recess, wherein it runs from a lower area of the flange 10 axially upwards and projects by a specified amount over the associated front surface 18 of the flange 10. The purpose of the latch protrusion will be explained in greater detail. Furthermore, a ring-shaped recess 24 is provided in the front surface 18 of the flange 10 (see FIG. 5).

The sleeve-shaped body 8 of the receiving element 2 consists of a sleeve-shaped wall 25 in the area between the flange 10 and the insertion section 12. The flange 10 of the receiving element 2 is located in a first radial plane at a right angle to the longitudinal axis of the receiving element 2. At least one radially projecting holding projection 26 is arranged in a second radial plane separated from the first radial plane. According to the embodiment shown in FIGS. 4 and 6, two radially projecting holding projections 26 are provided opposite each other in the second radial plane. It is thus also conceivable to use more than two holding projections 26 on one receiving element 2. Axially running reinforcing ribs are preferably provided in order to reinforce the holding projection 26 (see FIG. 4, 7).

Figure 7:
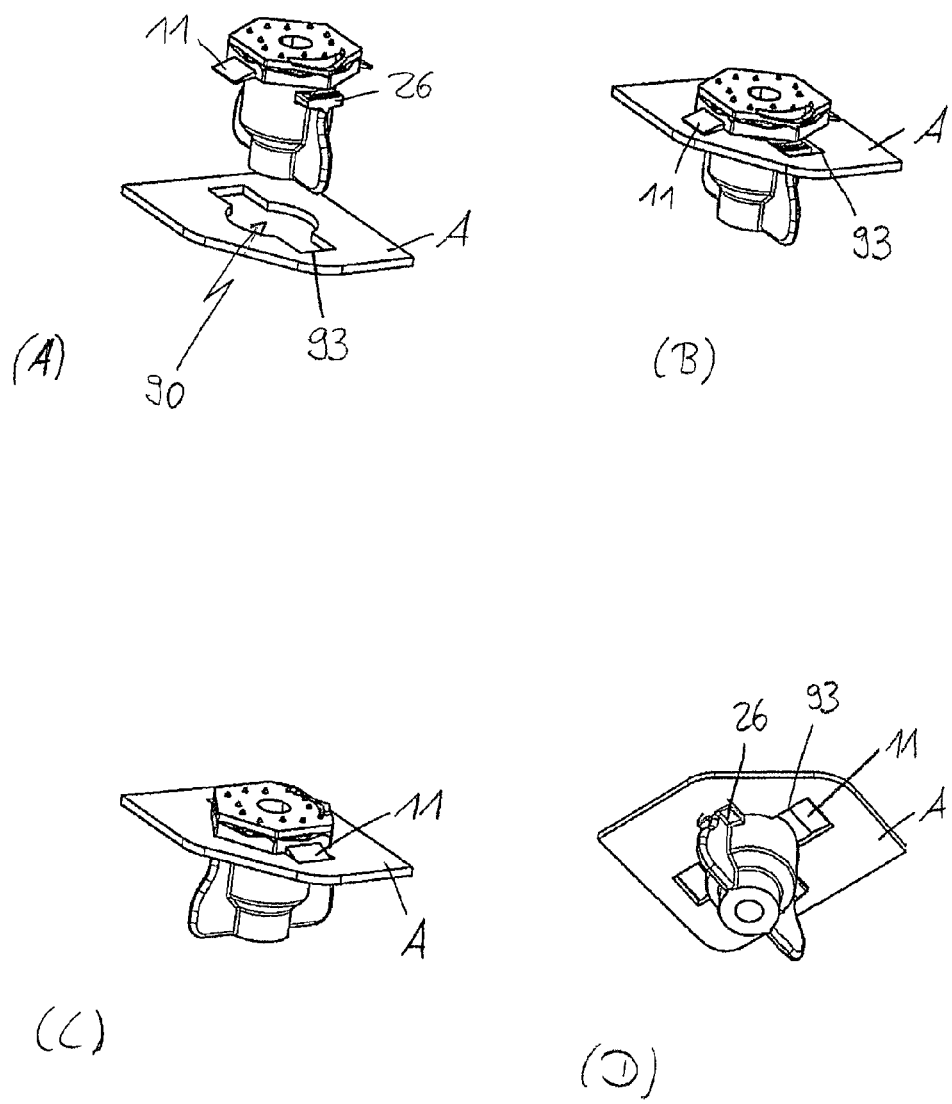
FIG. 7A through D show perspective views of different stages of the assembly of the receiving element in component A.

The holding projection 26 is shaped similarly to a triangle. One side of the triangle is arranged approximately parallel to the bottom side of the flange 10. Another side of the triangle is adjacent to the sleeve-shaped wall 25 of the receiving element 2. The first and second radial planes of the receiving element 2 are distanced such that the component A can be received between the bottom side of the flange 10 and the holding projection 26. It is preferred to distance the bottom side of the flange 10 and the side of the holding projection 26 running parallel to the bottom side of the flange 10 by the approximate thickness of the component A. The advantages of this construction are covered in the description for FIG. 7 (see below). The receiving element 2 is thus held in a positive and/or frictional manner on component A through the receiving of component A between flange 10 and at least one holding projection 26.

For further support of the connection between component A and receiving element 2, the holding projection 26 preferably comprises an insertion bevel 27. This construction is shown enlarged in FIG. 8. The side of the holding projection 26 with respect to the flange 10 is designed parallel to this. The insertion bevel 27 borders this parallel side and forms a sloping plane, which is tilted away from the bottom side of the flange 10. This geometry facilitates and supports the insertion of the component A between the holding projection 26 and flange 10 of the receiving element 2.

If component A is designed thicker than the distance between the bottom side of the flange 10 and the parallel side of the holding projection 26, the insertion bevel 27 enables the insertion of the component A up to a certain point. Since the holding projection 26 is made of plastic, the component A shears off the impeding height of the holding projection 26 as of this certain point, while the component A is pushed further into the intermediate space between the holding projection 26 and the flange 10. An optimal coordination of the distance between flange 10 and holding projection 26 with the thickness of the component A is achieved in this manner. This coordination ensures a fastening free from clearance, receiving of component A on the receiving element 2.

In accordance with another preferred embodiment, the receiving element 2 comprises at least one spring element 11 (see FIGS. 4, 5, 6 and 7). The spring element 11 is preferably arranged adjacent to the flange 10, while it is tilted towards the holding projection 26 from its radial plane in the direction of the longitudinal axis of the receiving element 2. If the component A is inserted between flange 10 and holding projection 26, the spring element 11 is thus bent in the radial plane of the flange 10 by the surface of the component A. The component A is thus pressed against the holding projection 26 by the spring force of the spring element 11, which support a tolerance equalization with respect to the thickness of the component A and the distance between flange 10 and holding projection 26.

Two spring elements 11 are arranged oppositely in the embodiment in FIG. 4. It is also conceivable to arrange a plurality of spring elements 11, which are distributed circumferentially on the flange 10. If the component A in the installed state has openings or recesses 93 near the flange 10 (see FIG. 7), at least one spring element 11 snaps in place into such an opening 93. A locking against the further turning of the receiving element 2 around its longitudinal axis is achieved in this manner. It is also preferred that at least one spring element 11 works like a locking element, while at least one other spring element 11 preloads the component A in the direction of the holding projection 26.

If the receiving element 2 is turned on its longitudinal axis after the fastening on component A, the locking spring element 11 prevents this turning. Only when a minimum torque affects the receiving element 2 is the spring element 11 removed in the opening 93 from the receiving element 2, preferably sheared off. The receiving element 2 can then be removed from component A.

Furthermore, the receiving element 2 is provided with an internal thread 28, which spans the inside of the sleeve-shaped wall 25 and the flange 10.

Now, in addition to FIG. 10, reference is made to FIGS. 1 through 3, which show the adjustment element 4 in detail. The adjustment element 4 consists of a sleeve-shaped body 30, which switches to a flange 32 on its upper end. On its top side, the flange 32 has a front surface 34, on which small nibs 36 projecting axially upwards (see FIG. 1 through 3) are formed.

The flange 32 is provided with a front surface 38 on the side turned away from the front surface 34, in which according to an embodiment not shown several latch recesses 40 distributed over the perimeter are formed. The latch recesses 40 work together with the aforementioned, not shown latch protrusion of the receiving element 2 such that they can form a detachable latch connection, which ensures that the receiving element 2 and the adjustment element 4 align with each other in predetermined angle positions, as will be explained in greater detail.

As can be seen in FIGS. 2 and 5 in particular, the receiving element 2 and the adjustment element 4 have non-circular longitudinal contours in the area of their flanges 10 and 32, each of which are designed hexagonally in the exemplary embodiment shown but can also have other shapes. If these align with each other, a spanner (not shown) can be placed on the flanges 10 and 32 in order to turn in common the receiving element 2 and the adjustment element 4.

A ring-shaped socket 42, which can immerse into the ring-shaped recess 24 of the flange 10 of the receiving element 2, is provided on the bottom side of the flange 32. In an area below the flange 32, the sleeve-shaped body 30 of the adjustment element 4 is provided with two diametrically opposed windows 44, in which two elastic drag arms 46 are arranged, see in particular FIGS. 3 and 10. The drag arms 46 are designed on the inner perimeter of the flange 32, from there run axially downwards and protrude radially towards the inside such that they can form a drag connection with the screw 6, which will also be explained in greater detail.

Figure 9:
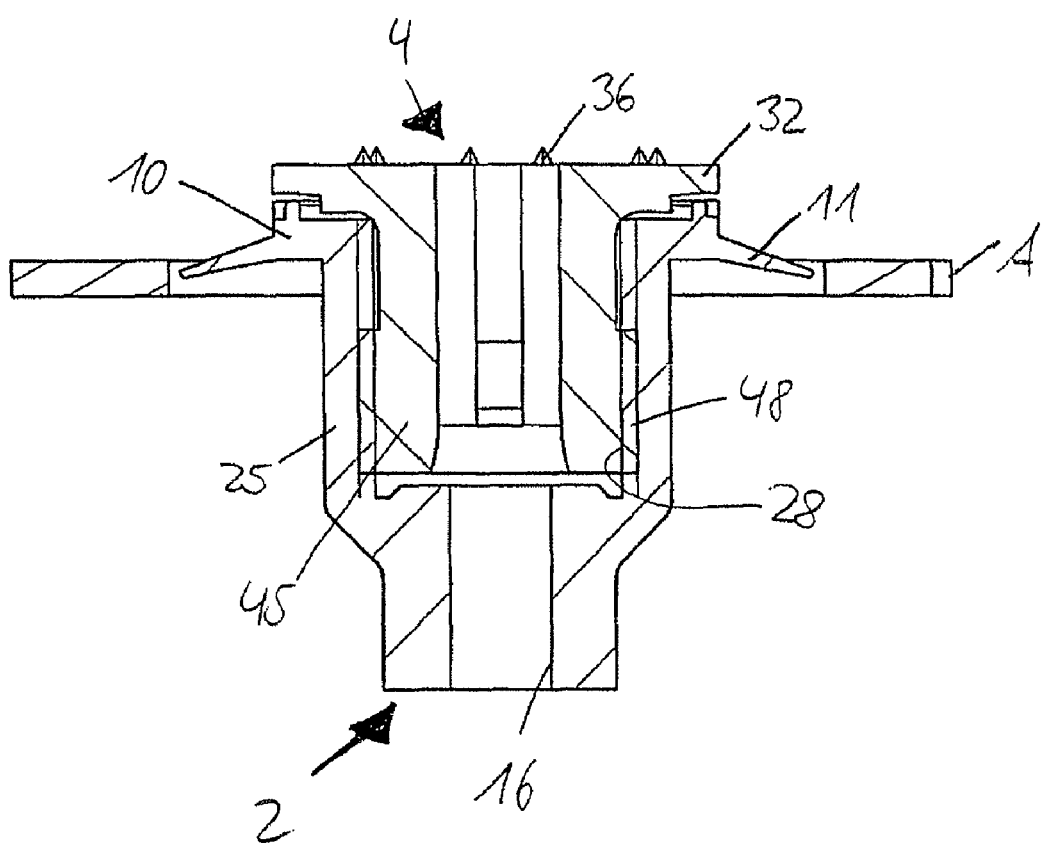
FIG. 9 shows a sectional view of the structural unit E and the component A after installation in accordance with FIG. 7.

The sleeve-shaped body 30 of the adjustment element 4 has an apron-like socket 45 in its lower area, which is provided with an external thread 48 on its perimeter (FIG. 9).

The screw 6 is e.g. a conventional steel screw with a head 50, a threaded shaft 52 and a self-cutting and/or self-furrowing thread 54, which forms a counter thread 56 when screwed into the smooth-walled bore hole 16 of the receiving element 2.

The components A and B are preferably made of plastic. The component A is e.g. made of a glass-fiber-reinforced PP, while the component B is made of a softer plastic, e.g. a PP with talcum. It is also preferred that component A is made of metal or other materials. As can be seen in FIG. 7a, the component A comprises a keyhole 90, in which the receiving element 2 can be received and fastened. The keyhole 90 is designed almost complementary to the silhouette of the receiving element 2 within the second radial plane. For example, two holding projections 26 lie in the second radial plane, while the remaining form of the receiving element 2 is given by the wall 25. If a different number of holding projections 26 is provided, the form of the keyhole 90 is modified accordingly in order to ensure an insertion of the receiving element 2 into the keyhole 90. The inner diameter of the keyhole 90 is also smaller than the outer diameter of the flange 10 so that the receiving element 2 can be held in a positive manner in component A.

After insertion of the receiving element 2 into the keyhole 90 in the suitable direction, the spring element 11 and the flange 10 are arranged above component A and the holding projection 26 below component A. If the receiving element 2 is pushed in the direction of component A and is subsequently turned on its longitudinal axis, the holding projections 26 are moved away from the openings 93 for insertion. Based on this turning, a positive connection is established between component A and the receiving element 2.

As can be seen in FIG. 7A, the spring element 11 and the holding projection 26 are arranged offset from each other circumferentially by 90°. Other angles arrangements are also conceivable, which can be realized in coordination with component A. After insertion of the receiving element 2 into the keyhole 90, wherein the holding projections 26 are aligned with the opening 93, as shown in FIG. 7B, the receiving element 2 is turned on its longitudinal axis. The receiving element 2 is preferably turned by an angle of 90° on its longitudinal axis so that the spring elements 11 preloaded by the surface of component A snap into the opening 93. It is also possible to provide recesses or locking openings on/in the surface of component A, which are not identical to the insertion openings 93 of the holding projections 26. These recesses or locking openings (not shown) then only serve to lock/snap in the spring elements 11 and not to insert the holding projections 26.

The spring elements 11 in the locked state are shown from above in FIG. 7C and from below in FIG. 7D. In this state, the component A is clamped between flange 10 and the holding projection 26 so that a positive and frictional connection is present between component A and the receiving element 2.

In order to remove the receiving element 2 from component A, the receiving element 2 would have to be turned against the locking force of the spring element 11 along its longitudinal axis. This turning removes the spring element 11 from receiving element 2, wherein it is preferably sheared off. If the holding projections 26 are then brought into alignment with the insertion openings 93, the receiving element 2 can then be removed from component A. A new receiving element 2 can then be inserted into the keyhole 90.

In order to summarize the above description, the insertion and fastening of the receiving element in component A can be described with the following steps: a) alignment of keyhole 90 and receiving element 2 with each other, b) insertion of the receiving element 2 into the keyhole 90, c) turning of the receiving element 2 on its longitudinal axis so that the component A is held between flange 10 and holding projection 26. In the same manner, the removal of the receiving element 2 can be summarized with the following steps: a) turning of the receiving element 2 on its longitudinal axis, wherein locked spring elements 11 are removed, b) alignment of the receiving element 2 with the keyhole 90 and c) removal of the receiving element 2 from the keyhole 90.

The receiving element 2 and the adjustment element 4 are made of plastic, wherein the plastic of the receiving element 2 is advantageously harder than the plastic of the adjustment element 4. For example, the receiving element 2 is made of a fiber-reinforced PPA, e.g. with a glass-fiber share of 50%. For example, the adjustment element 4 is made of a fiber-reinforced PA, e.g. with a glass-fiber share of 30%.

The installation and functionality of the fastening apparatus is explained below:

First, the receiving element 2 and the adjustment element 4 are screwed together via the internal thread 28 and the external thread 48 in order to form the preinstalled structural unit E, see FIG. 9. When screwing the adjustment element 4 into the receiving element 2, the latch protrusion 20 latches into one of the six latch recesses 40 (see FIGS. 6 and 8), shortly before the front surfaces 18 and 38 of the flanges 10 and 32 of the receiving element 2 and adjustment element 4 abut against each other. In the latched position, the maximum separation distance between the front surfaces 18 and 38 is one-sixth of the thread pitch of the thread connection 28, 48; it is thus equal to the thread pitch, divided by the number of latch recesses.

The latch protrusion 20 and the corresponding latch recess 40 thus form a detachable latch connection, via which the receiving element 2 and the adjustment element 4 are held in a detachable manner in one of six predetermined angle positions. In these angle positions, the receiving element 2 and the adjustment element 4 are thus aligned with respect to each other such that their non-round longitudinal contours (hexagon) are aligned.

The latch connection 20, 40 between the receiving element 2 and the adjustment element 4 fulfills two functions. For one, it serves as a transport safeguard so that the receiving element 2 and the adjustment element 4 can be handled as structural unit E. The latch connection also ensures the receiving element 2 and the adjustment element 4 in one of the six predetermined angle positions, in which the structural unit E can preferably be inserted into the keyhole 90 of the component A by a common spanner (hexagon socket not shown), see FIG. 7.

Now, for example, the component B of the headlight housing (not shown) can be immobilized by means of gauges in a position, in which it has separation distance S from component A. As already mentioned, the separation distance S can vary based on installation and/or production tolerances. When installing the fastening apparatus, which is now described using FIG. 10 through 14, an automatic tolerance equalization takes place.

Figure 11:
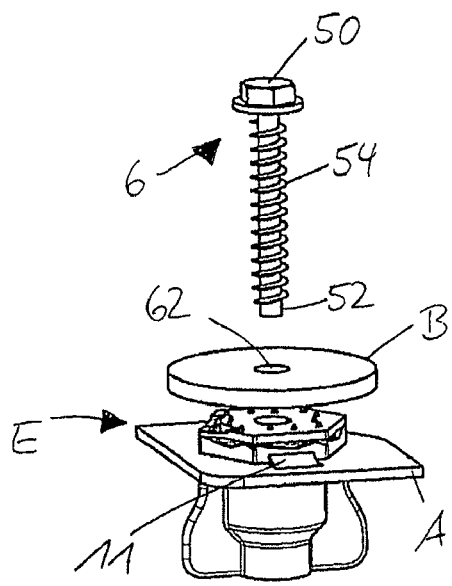
FIG. 11 through 14 show perspective views of different assembly states of the fastening apparatus shown in FIG. 10.
Figure 12:
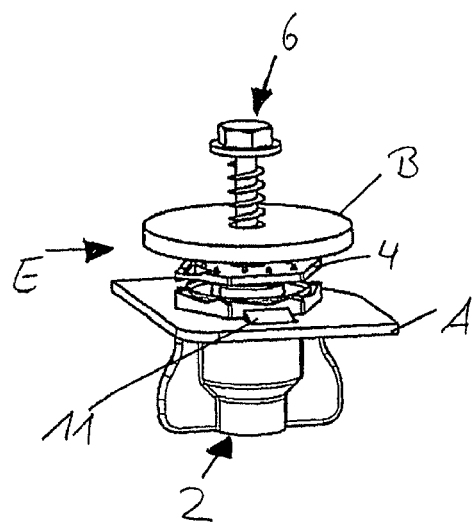
Figure 13:
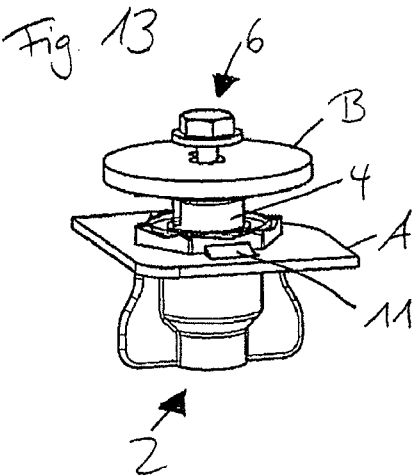

As follows from FIGS. 11 and 12, the screw 6 is first screwed into the structural unit E through a hole 62 of component B. The adjustment element 4 is also rotated due to the drag connection between the thread 54 of the screw 6 and the drag arms 46 of the adjustment element 4. The internal thread 28 of the receiving element 2 and the external thread 48 of the adjustment element 4 form a thread connection, which is left-handed in the exemplary embodiment shown. The adjustment element 4 is thus screwed out of the receiving element 2 by the screw 6.

The drag connection between the drag arms 46 and the thread 54 of the screw 6 as well as the latch connection between the latch protrusion 20 and the latch recesses 40 are designed such that the release torque of the drag connection 46, 54 is larger than the release torque of the latch connection 20, 40. This is achieved through the geometry and selection of substances (e.g. a high fiber-glass share in the plastic of the adjustment element 4). This ensures that with the dragging along of the adjustment element 4 the latch protrusion 20 slides out of the concerned latch recess 40 without the drag connection between the thread 54 of the screw 6 and the drag arms 46 of the adjustment element 4 being released.

If the flange 32 moves up against the component B, the tips 36 are pushed into the material of component B. The adjustment element 4 is secured from release in this manner. The structural unit 4 now bridges the separation distance S so that the automatic tolerance equalization is achieved.

When the screw 6 is screwed in further, the release torque (frictional torque) of the drag connection 46, 54 is overcome so that the screw 6 turns relative to the adjustment element 4. The thread 54 of the screw 6 in the smooth-walled bore hole 16 of the receiving element 2 thereby forms the counter-thread 56, whereby a second thread connection is established between the screw 6 and the receiving element 2. The second thread connection has a thread direction that is opposite the one of the thread connection 28, 48; in the present exemplary embodiment, the thread 54 of the screw 6 and the counter-thread 56 formed in the receiving element 2 are thus right-handed.

Figure 14:
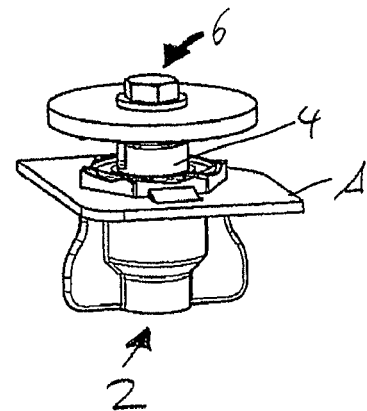

If the screw 6 is screwed in until the screw head 50 is against component B, the fastening apparatus is completely assembled, see FIGS. 10 and 14. As already mentioned, a frictional connection does not have to be created since the component A and B can be moved to other positions (not shown). However, it is understood that the fastening apparatus could also establish a frictional connection between components A and B depending on the application case.

In the shown exemplary embodiment, the receiving element 2 and the adjustment element 4 have non-round circumferential contours in the form a hexagon, which align with each other in the angle positions specified by the latch connection. In a modified embodiment, the adjustment element has another circumferential contour as the receiving element, for example a circular contour. However, it must be ensured that the circumferential contour of the adjustment element does not protrude over that of the receiving element.

Figure 8:
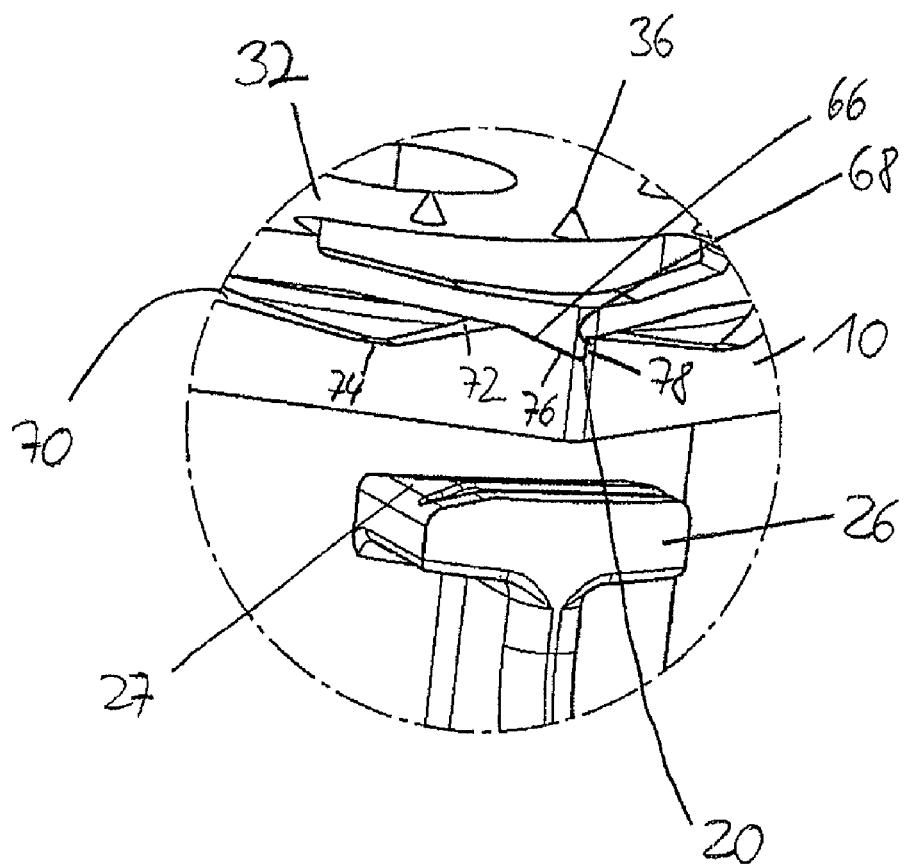
FIG. 8 shows an enlarged detail of the receiving element.

Another modified embodiment of the invention is explained in greater detail based on FIGS. 2, 6 and 8. The latch protrusion 20 is provided on the adjustment element 4, while the latch recesses 40 distributed around the perimeter are provided on the receiving element 2. Each of the latch recesses 40 has the form of a notch provided on the front side of the flange 10 of the adjustment element 4, which is restricted on one side by an axially running stop surface 68 and on the other side by an inclined plane 66. Each of two neighboring latch recesses 40 are connected through two ramp surfaces 70, 72, which run from the two neighboring latch recesses 40 diagonally downwards (in FIGS. 6 and 8) and meet in a bottom 74.

The latch protrusion 20 has the form of a sawtooth, which is restricted on one side by an axially running stop surface 78 and on the other side by an inclined surface 76. The stop surfaces 68, 78 and the inclined surfaces 66, 76 of the latch protrusion 20 and the latch recesses 40 work together as will be explained in greater detail.

In the exemplary embodiment shown, the latch protrusion 20 is provided on a thin strip of material, which is made up of two arms 80, 82. As can be seen in particular in FIG. 2, the strip of material 80, 82 runs on the outer perimeter of the flange 32 of the adjustment element 4 in the circumferential direction and is characterized in that it is separated from the other area of the flange 32 through a continuous recess 22 in the flange 32. Thus, the strip of material 80, 82 is shaped only on its opposite ends on the flange 32 of the adjustment element 4. The two arms 80, 82 of the material strip are tilted downward slightly (in FIGS. 1 and 8) and meet in the latch protrusion 20. Based on the described geometry and the material used (plastic), the latch protrusion 20 is resiliently malleable axially in order to be able to work together with the latch recesses 40 in the desired manner.

While screwing the adjustment element 4 into the receiving element 2, the flange 32 of the adjustment element 4 nears the flange 10 of the receiving element 2, and the latch protrusion 20 glides along the ramp surface 72 of one of the latch recesses 40 until the latch protrusion 20 snaps into the corresponding latch recess 40. In this latched position, the axially running stop surfaces 68, 78 of the adjustment element 4 and of the receiving element 2 are adjacent to each other so that another turn of the adjustment element 4 relative to the receiving element 2 is prevented. The risk of the locking of the adjustment element 4 and the receiving element 2 is thus avoided.

An opposite turning of the adjustment element 4 relative to the receiving element 2 is enabled through the inclined surfaces 66, 76. Even in the case of this embodiment, the release torque of the latch connection defined by the inclined surfaces 66, 76 is less than the release torque of the drag connection. If thus during the tolerance equalization process the screw is turned into the adjustment element 4, the fastening screw can screw the adjustment element 4 out of the receiving element 2 as in the exemplary embodiment, wherein the axially resilient "suspended" latch protrusion 20 slides over the inclined surface 66 of the concerned latch recess 40.

The latch connection 20, 40 in the embodiment is thus characterized by precise functionality and high operational reliability.

We claim:

1. A fastening apparatus for fastening a second component to a first component to automatically equalize tolerances in the separation distance between the second component and the first component, the apparatus comprising:

a receiving element having a longitudinal axis defining a longitudinal direction and including a circumferentially extending flange disposed in a first radial plane at a right angle to the longitudinal axis, and a radially-projecting holding projection disposed below the flange so that the receiving element can be substantially immobilized through frictional interaction of the first component between the flange and the holding projection;

an adjustment element adapted to be coupled to the receiving element via a first thread pairing in a first thread direction, and a fastening screw adapted to be coupled to the receiving element via a second thread pairing in a second thread direction opposite the first thread direction, wherein the fastening screw is adapted to be coupled to the adjustment element via a detachable drag connection, allowing the adjustment element to turn when the fastening screw is turned to thereby substantially equalize the tolerances in the separation distance between the first and second components; and a spring element extending in a radial direction from the flange and being resiliently tilted towards the holding projection in the longitudinal direction, and further adapted to be resiliently deformed in a direction away from the holding projection during installation of the receiving element in the first component, and further adapted to be removed from the receiving element in a snapped-in state allowing the receiving element to be turned with a torque applied along the longitudinal axis.

2. The fastening apparatus according to claim 1, wherein the receiving element includes a spring element that is circumferentially offset with respect to the holding projection, and wherein the spring element is disposed in the longitudinal direction of the receiving element.

3. The fastening apparatus according to claim 1, wherein the holding projection includes an insertion bevel disposed on a side of the holding projection facing the flange so that the first component can be inserted between the flange and the holding projection.

4. The fastening apparatus according to claim 2, wherein the spring element is adapted to be snapped into an opening or recess disposed in the first component to substantially prevent rotation of the receiving element relative to the longitudinal axis.

5. The fastening apparatus according to claim 1, wherein the flange is disposed in the first radial plane of the receiving element and the holding projection is disposed in a second radial plane of the receiving element, the first and second radial planes being separated from each other such that the first component can be disposed between the first radial plane and the second radial plane.

6. The fastening apparatus according to claim 1, wherein the adjustment element is adapted to be moved to an end position when the adjustment element is coupled to the receiving element, whereby the receiving element and the adjustment element are respectively disposed in pre-determined angular positions relative to the longitudinal direction via a detachable latch connection.

7. A first component in combination with the fastening apparatus according to claim 1, wherein the first component includes a keyhole wherein the receiving element can be immobilized.

8. The first component in combination with the fastening apparatus according to claim 7, wherein the keyhole of the first component defines a silhouette of the receiving element along a second radial plane.

9. A method of inserting and fastening the fastening apparatus according to claim 1 in a keyhole of a first component, the method comprising:
   aligning the keyhole and receiving element having a longitudinal axis with each other;
   inserting the receiving element into the keyhole;
   turning the receiving element along a longitudinal axis such that the first component is disposed between the flange and the holding projection.

10. A method for removing the fastening apparatus according to claim 1, wherein the fastening apparatus is disposed in a keyhole of the first component, wherein the method comprises:
   turning the receiving element along the longitudinal axis, thereby removing locked spring elements;
   aligning the receiving element with the keyhole; and
   removing the receiving element from the keyhole.

* * * * *